Figure 1:
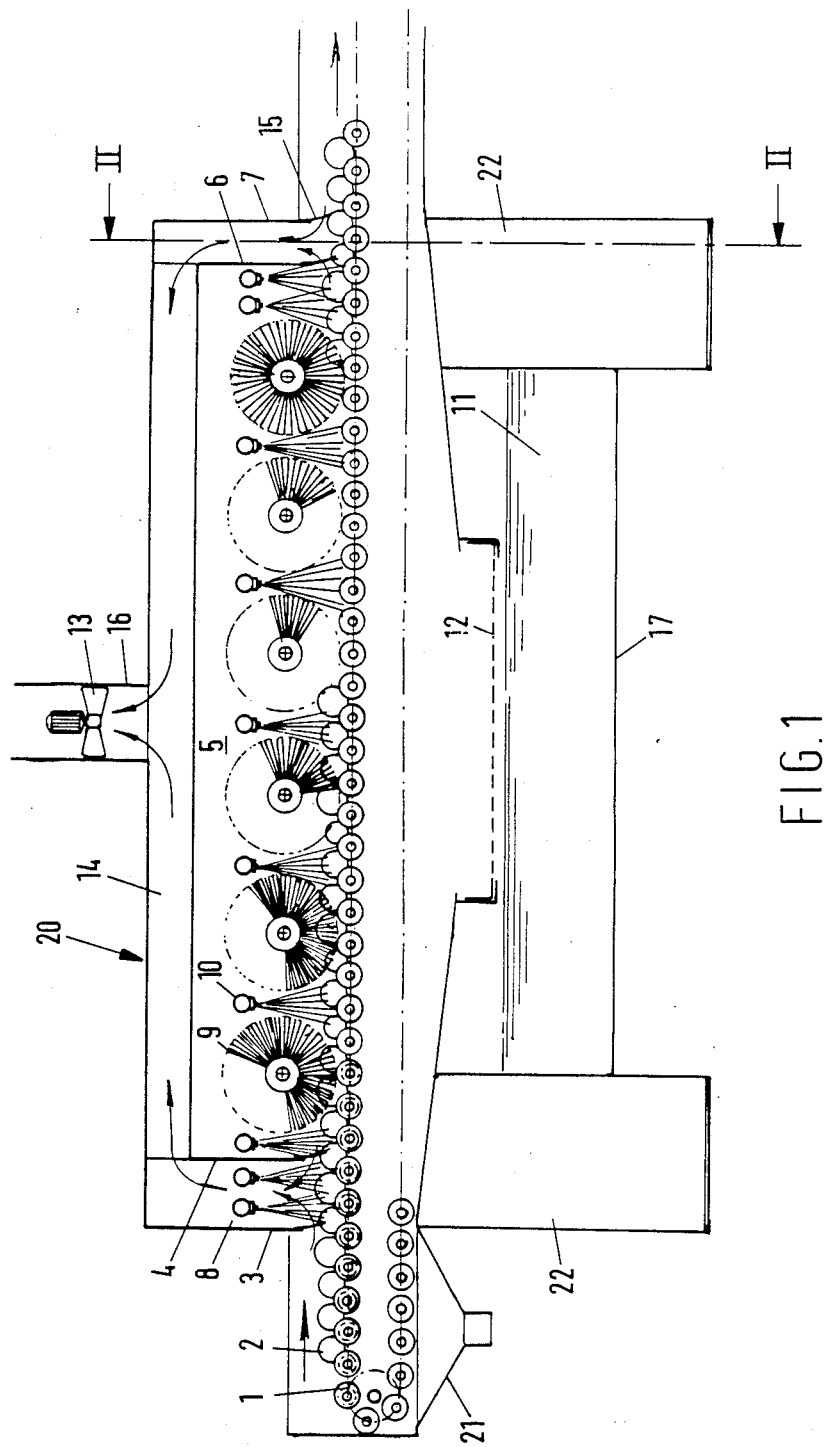

United States Patent [19]

van der Schoot

[11] Patent Number: 4,985,956
[45] Date of Patent: Jan. 22, 1991

[54] WASHING MACHINE VAPOR EXHAUST

[75] Inventor: Jelle van der Schoot, Aalten, Netherlands

[73] Assignee: Staalkat B.V., Aalten, Netherlands

[21] Appl. No.: 367,804

[22] Filed: Jun. 19, 1989

[51] Int. Cl.⁵ .............................................. A01K 43/00
[52] U.S. Cl. ..................................... 15/3.13; 15/3.17; 34/217; 34/236; 134/72
[58] Field of Search ................. 15/3.13–3.21; 134/72, 73; 34/217, 236; 68/5 E

[56] References Cited

U.S. PATENT DOCUMENTS

| | | | |
|---|---|---|---|
| 3,049,135 | 8/1962 | Kuhl et al. | 134/72 |
| 3,099,848 | 8/1963 | Mountz | 15/3.14 |
| 3,155,102 | 11/1964 | Niederer, Jr. et al. | 15/3.13 X |
| 3,392,414 | 7/1968 | Cathcart . | |
| 3,848,730 | 11/1974 | Niederer et al. . | |
| 4,125,914 | 11/1978 | Warren . | |
| 4,189,849 | 2/1980 | van der Schoot . | |
| 4,411,075 | 10/1983 | Blaudszun | 68/5 E |
| 4,499,623 | 2/1985 | Kuhl . | |
| 4,698,867 | 10/1987 | Kuhl . | |
| 4,821,754 | 4/1989 | Weil | 134/72 |

*Primary Examiner*—Edward L. Roberts
*Attorney, Agent, or Firm*—Griffin Branigan & Butler

[57] ABSTRACT

Apparatus for cleaning objects such as eggs and fruit. The apparatus comprises a housing, a roller conveyor having an upper run extending through the housing, one or more rotary brushes disposed over the upper run, one or more sprayers directed towards the conveyor, and a liquid rceptacle underneath the upper run. To prevent, or at least substantially mitigate the production of vapor in the place where the apparatus is disposed, means are provided for exhausting vapor at the positions where the conveyors enters and leaves the housing. Preferably the housing is double-walled at least where the conveyor enters and leaves the housing, and the cavities between the walls are kept continuously under a subatmospheric pressure.

9 Claims, 2 Drawing Sheets

WASHING MACHINE VAPOR EXHAUST

This invention relates to apparatus for cleaning objects such as eggs and fruit. Apparatus of the kind to which this invention relates is disclosed in my prior U.S. Pat. No. 4,793,015, which is incorporated herein by reference. The apparatus comprises a housing, a roller conveyor having an upper run extending through the housing, one or more rotary brushes disposed over said upper run, one or more sprayers directed towards the conveyor, and a liquid collecting means underneath the upper run. Although the prior apparatus works quite satisfactorily, it has been found that it produces considerable amounts of vapour, especially at the points where the conveyor enters and leaves the housing, from the hot water with which the articles are being sprayed and brushed.

This vapour causes a high humidity in the atmosphere in the space where it is arranged, and causes unnecessary corrosion and other damage to apparatus disposed in such space.

It is an object of the present invention to remove this drawback.

To this effect, according to the present invention, means are provided for exhausting vapour at the positions where the conveyor enters and leaves the housing. Preferably, the housing is double-walled at least where said conveyor enters and leaves said housing, and means are provided for keeping the cavity between the walls continuously under a subatmospheric pressure.

The two double-walled parts may be interconnected and jointly communicate with one exhaust duct incorporating blower means.

To provide for maximum cleansing effect in as small a housing as possible, at least one sprayer may be disposed in the cavity between the walls where the conveyor enters the housing. By supplying water with a slight overpressure through said sprayer, the articles supplied by means of the conveyor are gently sprayed, so that dirt present on the articles may be soaked off before being contacted with the brushes in the washing compartment proper. As only a small overpressure is used, relatively little vapour is produced for discharge.

Conversely, at the point where the conveyor leaves the housing, sprayers operating at a higher overpressure may be disposed within the housing of the washing apparatus, rather than in the cavity between the walls, for removing the last remainders of dirt from the products being cleaned.

The inventive concept set forth above is not suggested or disclosed in the washing apparatus as described in U.S. Pat. Nos. 4,698,867 and 4,499,623, both in the name of Henry Kuhl. The invention is also not suggested or disclosed by our U.S. Pat. No. 4,189,849, or by U.S. Pat. No. 4,125,914 to William Warren, U.S. Pat. No. 3,848,730 to Otto Niederer, or U.S. Pat. No. 3,392,414 to John Cathcart.

One embodiment of the invention will now be described, by way of example, with reference to the accompanying drawings. In said drawings, FIG. 1 shows a longitudinal sectional view of an apparatus for cleaning eggs according to the present invention; and FIG. 2 shows a cross-sectional view, taken on the line II—II of FIG. 1.

Referring to the drawings, there is shown an apparatus for cleaning eggs comprising a housing 20, through which a roller track or conveyor 1 can move, on which eggs 2 are transported. At the input end (the directional movement of conveyor 1 is indicated by arrows), housing 20 is provided with double walls 3 and 4.

Similarly, at the output end for conveyor 1, the housing is provided with double walls 6,7. The cavities between walls 3,4 and 6,7 are interconnected by a duct 14 which is connected to a discharge duct 16 in which a blower 13 is disposed.

Figure 2:
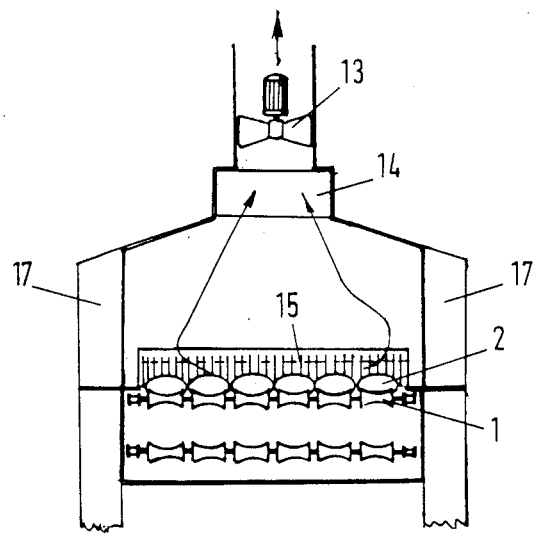

As further shown by FIG. 1, a pair of sprayers or pre-sprayers 8 are arranged in the cavity between walls 3,4, while a third sprayer 8 is disposed just downstream of wall 8. In the washing apparatus proper, a plurality of brushes 9 are disposed with sprayers 10 between them, which through the spaces between the brushes are each directed on to the eggs 2 moving under and past them. At the output end of housing 20, but before the connection formed by double wall 6,7, a pair of sprayers 10 are disposed which can operate at a higher overpressure than sprayers 8 at the input end. The cavities of the double wall are sealed from the actual washing compartment by known per se flexible rubber or plastic curtains or skirts 15.

Housing 20 is provided at the bottom with a receptacle 17 for collecting spray or washing water 11 and a sieve 12 is arranged between housing 20 and receptacle 17. For cleaning sieve 12, the apparatus has been made readily accessible through means not shown.

Water 11 from receptacle 17 is recycled to the sprayers through known per se means, not shown.

As best shown in FIG. 2, enclosed chambers 17 are arranged laterally of the inner wall of the housing, which chambers are not under the influence of blower 13, that is to say, they are not under a subatmospheric pressure, but only serve to accommodate the bearings of the shafts of the brushes and for accommodating the supply lines to the sprayers: for clarity, however, these parts are not shown. Moreover, these elements are well known per se.

It will be clear that a large number of modifications and variants are possible without departing from the scope of the invention. Thus collecting means 21 for leakage water, shown at the input end in the drawing could as well be omitted, and, instead, the bottom wall of the housing at that point could be connected to housing 20 in such a manner and at such an angle that the leakage water flows direct to receptacle 17, that is to say, through sieve 12. Also, other constructions of the brushes 9, not shown in any further detail herein, would be possible.

I claim:

1. In an apparatus for cleaning eggs and the like having a housing with an input end and an output end, a conveyor means disposed from the said input end to the said output end for conveying the eggs laterally through said housing, one or more brushing means disposed above said conveyor means for brushing the eggs disposed on said conveyor means, one or more liquid spraying means disposed within said housing for spraying a cleaning liquid on the eggs disposed on said conveyor means, and liquid collection means disposed under said conveyor means for collecting said cleaning liquid which passes through said conveyor means, the improvement comprising sub-atmospheric pressure exhaust means disposed near the said input end and said output end for exhausting vapors of the cleaning liquid from the housing, whereby said vapors are substantially prevented from escaping from the housing into the atmosphere around the housing, said exhaust means being formed by an outside wall and an adjacent inside wall of the housing at the said input end and at the said output end, whereby double walls having cavities therebetween are formed and said cavities are maintained at said sub-atmospheric pressure.

2. The apparatus of claim 1 wherein the said cavities are connected to a common exhaust duct having a sub-atmospheric pressure producing means associated therewith.

3. The apparatus of claim 1 wherein said outside wall and said inside wall form double walls having cavities extending from said input end and said output end to said common exhaust duct.

4. The apparatus of claim 1 wherein at least one first liquid spraying means is disposed within the said exhaust means at said input end.

5. The apparatus of claim 4 wherein at least one second liquid spraying means is disposed within the said housing and adjacent said exhaust means at said output end.

6. That apparatus of claim 5 wherein the said second liquid spraying means is operable to provide a higher pressure of said cleaning liquid than the pressure of the cleaning liquid produced by said first liquid spraying means.

7. The apparatus of claim 1 wherein a sieve disposed between the housing and said liquid collection means.

8. The apparatus of claim 7 wherein means are provided for ready access to said sieve.

9. The apparatus of claim 1 wherein enclosed chambers are disposed laterally of the said inside walls for accommodating journals for said brushing means and supply lines to said sprayers.

* * * * *